(12) United States Patent
Sinha et al.

(10) Patent No.: US 11,893,460 B2
(45) Date of Patent: Feb. 6, 2024

(54) METHOD AND SYSTEM FOR AI-POWERED SMART HOMES AND OFFICES

(71) Applicants: Navendu Sinha, Milpitas, CA (US); Anirban Banerjee, Brentwood, CA (US)

(72) Inventors: Navendu Sinha, Milpitas, CA (US); Anirban Banerjee, Brentwood, CA (US)

(*) Notice: Subject to any disclaimer, the term of this patent is extended or adjusted under 35 U.S.C. 154(b) by 99 days.

(21) Appl. No.: 17/576,882

(22) Filed: Jan. 14, 2022

(65) Prior Publication Data
US 2023/0229959 A1 Jul. 20, 2023

(51) Int. Cl.
*H04L 12/28* (2006.01)
*G06N 20/00* (2019.01)
*G05B 15/02* (2006.01)

(52) U.S. Cl.
CPC ............. *G06N 20/00* (2019.01); *G05B 15/02* (2013.01); *H04L 12/2803* (2013.01)

(58) Field of Classification Search
USPC .......................................................... 700/291
See application file for complete search history.

(56) References Cited

U.S. PATENT DOCUMENTS

2019/0377305 A1* 12/2019 Petrus .................. G05B 13/041

FOREIGN PATENT DOCUMENTS

WO       WO-2022053794 A2 *   3/2022    ............. G06N 20/00

* cited by examiner

*Primary Examiner* — Emilio J Saavedra

(57) ABSTRACT

AI-assisted Connected Home systems for improving power efficiency at homes and offices are described. The system may perform operations including: receiving, from each of a plurality of power receptacles, power usage information of an electrical device attached to the power receptacle; determining, for each of the plurality of power receptacles, a plurality of power usage metrics of the power receptacle based on the power usage information; feeding the plurality of power usage metrics into a machine learning model to obtain a priority of the electrical device attached to the power receptacle, wherein the priority is one of a plurality of pre-configured priorities; obtaining a power management signal; and transmitting a plurality of control signals to the plurality of power receptacles based on the power management signal and respective priorities of the plurality of electrical devices attached to the plurality of power receptacles.

18 Claims, 7 Drawing Sheets

400 receiving, by a computing device from each of a plurality of power receptacles, power usage information of an electrical device attached to the power receptacle ~410 determining, by the computing device for each of the plurality of power receptacles, a plurality of power usage metrics of the power receptacle based on the power usage information, wherein the plurality of power usage metrics comprise a power-switch frequency of the electrical device attached to the power receptacle and power consumption of the electrical device ~420 feeding, by the computing device, the plurality of power usage metrics into a machine learning model to obtain a priority of the electric device attached to the power receptacle, wherein the priority is one of a plurality of pre-configured priorities ~430 obtaining, by the computing device, a power management signal ~440 transmitting, by the computing device, a plurality of control signals to the plurality of power receptacles based on the power management signal and respective priorities of the plurality of electric devices attached to the plurality of power receptacles ~450

*FIG. 4*

METHOD AND SYSTEM FOR AI-POWERED SMART HOMES AND OFFICES

TECHNICAL FIELD

The disclosure relates generally to AI-powered Internet of Things (IoT) systems and methods for improving energy efficiency.

BACKGROUND

The growing popularity of Internet of Things (IoT) devices and appliances bring new opportunities to automate power consumption management and improve energy efficiency. IoT devices such as smart plugs, lights, coffee machines, washers and dryers, refrigerators usually have network capability of connecting to a smart home hub. Users may control these smart devices by configuring routines or sending voice commands through the hub. Unfortunately, today's smart home hubs merely manage the smart devices passively according to the user's input or configuration. These smart home systems may not be able to fully explore the potential of home automation. In this disclosure, an AI-assisted IoT system is described to provide automated end-point management to save energy and further improve energy efficiency.

SUMMARY

Various embodiments of the present specification may include systems, methods, and non-transitory computer-readable media for using IoT systems to improve energy efficiency.

According to a first aspect, A computer-implemented method for saving energies at homes and offices with an Internet of Things (IoT) system is described. The method may include: receiving, by a computing device from each of a plurality of power receptacles, power usage information of an electrical device attached to the power receptacle; determining, by the computing device for each of the plurality of power receptacles, a plurality of power usage metrics of the power receptacle based on the power usage information, wherein the plurality of power usage metrics comprise a power-switch frequency of the electrical device attached to the power receptacle and power consumption of the electrical device; feeding, by the computing device, the plurality of power usage metrics into a machine learning model to obtain a priority of the electrical device attached to the power receptacle, wherein the priority is one of a plurality of pre-configured priorities; obtaining, by the computing device, a power management signal; and transmitting, by the computing device, a plurality of control signals to the plurality of power receptacles based on the power management signal and respective priorities of the plurality of electrical devices attached to the plurality of power receptacles.

In some embodiments, the obtaining of the power management signal comprises: receiving the power management signal from an electric grid, wherein the power management signal comprises a broadcasted message for entering or exiting a power-saving mode.

In some embodiments, the obtaining of the power management signal comprises: receiving the power management signal from a smart device linked to the plurality of power receptacles for entering or exiting a power-efficient mode, or entering or exiting a power-saving mode.

In some embodiments, the plurality of power receptacles comprise a plurality of smart outlets with adjustable power output.

In some embodiments, the plurality of power receptacles are connected to the computing device through Bluetooth or a wireless connection.

In some embodiments, the plurality of pre-configured priorities comprise a high priority, a medium priority, and a low priority.

In some embodiments, the transmitting of the plurality of control signals to the plurality of power receptacles comprises: in response to the power management signal being entering a power-saving mode, determining, for each of the plurality of power receptacles, a corresponding control signal based on the priority of the electrical device attached to the power receptacle.

In some embodiments, the determining of the corresponding control signal comprises: if the priority of the electrical device is the high priority, sending a query signal to the power receptacle corresponding to the electrical device, wherein the query signal queries if the electronic device is safe to shut down; and if the priority of the electrical device is the low priority, sending a shutdown signal to the power receptacle corresponding to the electrical device for shutting down the electrical device.

In some embodiments, the determining of the corresponding control signal further comprises: if the priority of the electrical device is the medium priority, identifying the type of the electrical device; in response to the electrical device being a light, determining the control signal as dimming or turning off the light; and in response to the electrical device being a device installed with a driver program associated with the plurality of power receptacles, sending a shutdown signal to the power receptacle corresponding to the electrical device for the power receptacle to initiate the shut-down process through the driver program.

In some embodiments, the method further comprises: receiving, from the electrical device through the driver program, a confirmation indicating the electrical device is already shut down.

In some embodiments, the method further comprises training the machine learning model, wherein the training comprises: obtaining, from a plurality of training power receptacles installed in buildings registered for collecting training data, training power usage information of the plurality of training power receptacle; generating, using the machine learning model, priority labels of the plurality of training power receptacles based on the training power usage information; displaying the priority labels of the plurality of training power receptacles on a user-interface (UI) for user input; receiving one or more updated priority labels from the user input; updating feature weights of the machine learning model based on the one or more updated priority labels and corresponding power usage information.

In some embodiments, the power usage information comprises historical control signals received by the power receptacle and corresponding timestamps, wherein the historical control signals comprise switch-on signals, switch-off signals, and power adjustment signals.

In some embodiments, the obtaining of the power management signal comprises: crawling, using a webpage crawler, a website associated with an electricity grid to obtain an electricity rate schedule, wherein the electricity rate schedule comprises a plurality of rate tiers at different time windows; and generating the power management signal to enter a power-saving mode or a power-efficient mode at a point of time when an electricity rate changes to a higher tier.

In some embodiments, the transmitting of the plurality of control signals to the plurality of power receptacles comprises: determining a plurality of points of time for transmitting the plurality of control signals to the plurality of power receptacles; and transmitting each of the plurality of control signals to the plurality of power receptacles at a respective point of time.

In some embodiments, the method may further include: after transmitting a control signal to the power receptacle to change a power status, receiving a user-provided control signal that is different from the control signal; and updating the priority of the electrical device attached to the power receptacle based on the user-provided control signal.

According to a second aspect, an Internet of Things (IoT) system is described. The system may include a computing device configured with one or more processors and one or more non-transitory computer-readable memories coupled to the one or more processors and configured with instructions executable by the one or more processors to cause the system to perform operations. The operations may include: receiving, by the computing device from each of a plurality of power receptacles, power usage information of an electrical device attached to the power receptacle; determining, by the computing device for each of the plurality of power receptacles, a plurality of power usage metrics of the power receptacle based on the power usage information, wherein the plurality of power usage metrics comprise a power-switch frequency of the electrical device attached to the power receptacle and power consumption of the electrical device; feeding, by the computing device, the plurality of power usage metrics into a machine learning model to obtain a priority of the electrical device attached to the power receptacle, wherein the priority is one of a plurality of pre-configured priorities; obtaining, by the computing device, a power management signal; and transmitting, by the computing device, a plurality of control signals to the plurality of power receptacles based on the power management signal and respective priorities of the plurality of electrical devices attached to the plurality of power receptacles.

According to a third aspect, a non-transitory computer-readable storage medium is described. The storage medium may be configured with instructions executable by one or more processors to cause the one or more processors to perform operations, which may include: receiving, from each of a plurality of power receptacles, power usage information of an electrical device attached to the power receptacle; determining, for each of the plurality of power receptacles, a plurality of power usage metrics of the power receptacle based on the power usage information, wherein the plurality of power usage metrics comprise a power-switch frequency of the electrical device attached to the power receptacle and power consumption of the electrical device; feeding the plurality of power usage metrics into a machine learning model to obtain a priority of the electrical device attached to the power receptacle, wherein the priority is one of a plurality of pre-configured priorities; obtaining a power management signal; and transmitting a plurality of control signals to the plurality of power receptacles based on the power management signal and respective priorities of the plurality of electrical devices attached to the plurality of power receptacles.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 4 illustrates an example method for improving energy efficiency using an IoT system in accordance with some embodiments.

DETAILED DESCRIPTION

Figure 1A:
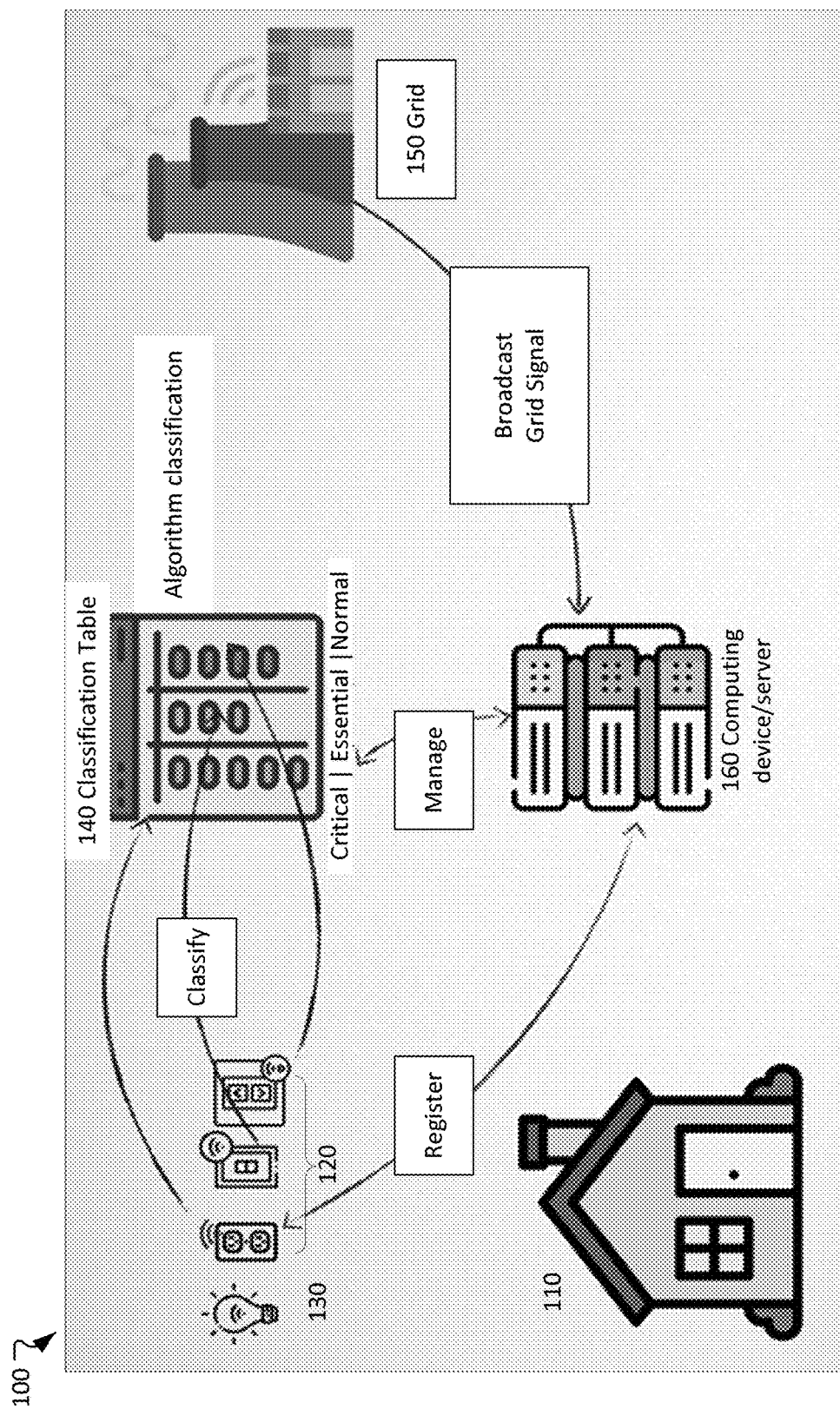
FIG. 1A illustrates an exemplary network environment associated with an Internet-of-Things (IoT) system for improving energy efficiency in accordance with some embodiments.

Embodiments described herein provide methods, systems, and apparatus associated with AI-powered Internet of Things (IoT) systems and methods for improving energy efficiency in homes, offices, or buildings.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

FIG. 1A illustrates an exemplary network environment 100 associated with an Internet-of-Things (IoT) system for improving energy efficiency in accordance with some embodiments. The exemplary network environment 100 in FIG. 1A includes the IoT system installed in a residential house 110 for illustrative purposes. Depending on the implementation, the IoT system may be installed in an office, a hotel, or another form of building that is equipped with electrical devices or appliances to improve power efficiency.

As shown, the IoT system may include various end-points which are capable of (but not limited to) interrupting interrupt AC or DC power, controlling the brightness of lighting devices. Smart light bulbs 130 (or strips, dimmers, etc.), smart plugs 120, electronic appliances (e.g., washer/dryer, dishwasher, oven, coffee machine, refrigerator) may be some possible implementations of such end-points. These end-points are embedded with sensors, processing ability, software, and other technologies that connect and exchange data with other devices and systems over the Internet or other communications networks, e.g., through WiFi or Bluetooth. For simplicity, these end-points may be referred to as power receptacles in the following descriptions, as they are generally connected to the primary alternating current (AC) power supply in a building and powered by electricity. Some power receptacles such as smart plugs may be attached with various electronic devices, and other power receptacles such as smart appliances/light bulbs may have built-in (another form of "attached") electronic devices.

In some embodiments, the IoT system may include a computing device or server 160 acting as a central hub for exchanging data with the power receptacles and performing data processing tasks. While the computing device or server 160 is shown in FIG. 1A as a single entity, this is merely for ease of reference and is not meant to be limiting. One or more components or one or more functionalities of the computing device or server 160 described herein may be implemented in a single computing device or multiple computing devices. In some embodiments, the computing device or server 160 may refer to an on-prem computing device (e.g., a smart home hub) or a cloud server communicating with the power receptacles through network connections. As shown in FIG. 1A, the power receptacles may register themselves by sending power usage information and device identifications to the computing device or server 160. The power usage information may include historical control signals received by the power receptacle and corresponding timestamps. The historical control signals may include switch-on signals, switch-off signals, and power adjustment signals.

In some embodiments, the computing device or server 160 may classify the power receptacles based on the corresponding power usage information. The classification result may be organized as a hierarchical classification table 140 with a temporal dimension (more details in FIGS. 2A and 2B). The classification table 140 may be stored in non-transitory storage media associated with the computing device/server 160. The classification table 140 may be constructed and managed by the computing device or server 160 using pattern recognition machine learning models. The classification table 140 may include each of the power receptacles associated with a corresponding priority level during a specific time window. The priority levels may include a high priority level (e.g., critical), a medium priority level (e.g., essential), and a low priority level (e.g., normal). Power receptacles with different priority levels may be treated differently when the IoT system decides to enter a power-efficient mode. This way, the IoT system may maximize power efficiency while maintaining the level of service for the high-priority power receptacles.

In FIG. 1A, the grid 150 may refer to a power grid or an electric grid that is outside of the IoT system. The grid 150 may broadcast power control signals to the IoT system according to a schedule or in response to emergency situations. For example, the grid 150 may send out power-saving notifications in response to excessive heat warnings. As another example, the residential house 110 may have a time-of-use rate agreement with a company associated with the grid 150. Based on the agreement, the electricity rates may change during different time windows. In other words, the computing device/server 160 of the IoT system may receive the power control signal from the grid or may be pre-programmed according to the rate-changing schedule. According to the signal or schedule, the computing device/server 160 may take action to manage the power receptacles according to the corresponding priorities.

Figure 1B:
FIG. 1B illustrates an exemplary system diagram of the IoT system for improving energy efficiency in accordance with some embodiments.

FIG. 1B illustrates an exemplary system diagram of the IoT system for improving energy efficiency in accordance with some embodiments. The components in the system diagram on FIG. 1B is for illustrative purposes only. Depending on the implementation, the IoT system may include fewer, more, or alternative components.

As shown, the IoT system in FIG. 1B includes a plurality of power receptacles 180 and an on-prem or cloud server 160 (referred to as server 160 hereafter). The power receptacles 180 may include a plurality of smart outlets or plugs with adjustable power output (e.g., a dimmer). That is, the power output of the power receptacles 180 may be adjusted to different levels. For example, one power receptacle 180 may consume the most power when its power output is at its highest level.

In some embodiments, the server 160 may include a data collection component 162, an end-point metrics determination component 164, an end-point classicization component 166, a power management signal receiving component 168, an end-point management component 169, and a database storing one or more end-point classification tables 170.

In some embodiments, the data collection component 162 may be configured to receive power usage information of each of the plurality of power receptacles 180. Here, the power receptacles 180 may refer to a smart plug or a smart electrical device connected to a plug. Each power receptacle 180 may receive signals such as switch off, switch on, adjusting a power output level from a human operator or a controller (e.g., a smart device, a smart home hub). The power receptacle 180 may send the received signals to the data collection component 162 in real-time. In some cases, if the power receptacle 180 detects that the data collection component 162 is offline (e.g., the connection is lost), it may store the signals along with the timestamps locally, and send them to the data collection component 162 once the connection is back online.

However, real-time collection of the power usage information may require installation of direct power measurement circuits or equivalent hardware that need to be stable over a wide range of environmental conditions. These requirements are expensive and sometimes impractical for a large-scale deployment. In some embodiments, an inference-based approach may be adopted to estimate the power usage information of each of the plurality of power receptacles 180. For example, a total power consumption of the plurality of power receptacles 180 for a preset period of time (e.g., every 30 minutes, every hour, or every two hours) may be obtained from various sources, such as the electric grid, an on-prem electricity meter, etc. Then the power states of the plurality of power receptacles 180 during the preset period of time may also be obtained. Then total power consumption and the power states of the power receptacles 180 may be fed into a trained linear regression model to estimate the power usage information of each of the power receptacles 180. The linear regression model may include multiple variables respectively corresponding to the power receptacles 180. Each variable may represent a weight of the corresponding power receptacle representing how much power it consumes if it is ON during the period of time. The values of the multiple variables may be learned using supervised learning based on historical data. In some embodiments, each variable may include more than one value. For example, the power consumption rate of a power receptacle may vary depending on various factors (e.g., TV may consume more power while displaying bright pictures and consume less power while displaying dark pictures, or a light dimmer may have different power consumption rates depending on the dimmer settings), and thus the variable may include a series of weights corresponding to different settings of the power receptacle. When estimating the power consumption of the power receptacle, the setting of the power receptacle may be obtained and used to fetch the proper weight for the estimation.

In some embodiments, the end-point metrics determination component 164 may be configured to determine a plurality of power usage metrics for each of the power receptacles 180 based on the corresponding power usage information. The plurality of power usage metrics may include a power-switch frequency of the power receptacle 180, durations in which the power receptacles 180 are in different states, and power consumption of the electrical device within each pre-configured time slots (e.g., every three or six hours). For example, the power usage metrics of each power receptacle 180 may include durations in which it is in "on," "off," and "low power" modes during every three-hour window, a frequency of power output adjustment during every three-hour window, and power consumption during every three-hour window.

In some embodiments, the end-point classification component 166 may be configured to feed the plurality of power usage metrics into a machine learning model to obtain a priority of the power receptacle. The priority may be one of a plurality of pre-configured priorities, such as critical, essential, and normal. In some embodiments, the machine learning model may be a neural network trained for pattern classification. The "pattern" here refers to the power usage metrics of the receptacles 180. For example, the power usage metrics of a receptacle during a day may be represented as a high-dimensional vector. Each element in the vector may correspond to a time window of the day, and each element may include multiple values representing the power usage metrics of the receptacles 180 during the corresponding time window.

In some embodiments, the machine learning model may be pre-trained before being deployed on server 160 based on training data. For instance, the training data may be obtained from a plurality of training power receptacles installed in buildings that are registered for data collection (e.g., in exchange for a discount or other suitable incentives). The training data may include power usage information of these training power receptacles. The training data may be fed into an initialized neural network to predict priority labels. The predicted priority labels may be displayed on a user interface (UI) for the users associated with the buildings to confirm or edit. The labels received from the users may be deemed as proper labels of the training data. The distance between the predicted labels and the proper labels may be used to adjust the parameters of the neural network to minimize the distance.

For instance, the neural network may be configured with a plurality of layers, including a feature embedding layer and an output layer. The feature embedding layer may be trained to assign the proper weights to different power usage metrics so that the distance between the proper labels and predicted labels is minimized. In some embodiments, the output layer may include a plurality of nodes respectively corresponding to a plurality of time windows throughout a day. Based on one piece of input power usage information from a power receptacle, the output layer may generate a predicted priority level of the receptacle in each of the plurality of time windows. For instance, the output layer may classify the power receptacle (e.g., corresponding to a TV in the living room) in the living room as a high priority in the evening (8 PM-11 PM), but a low priority during other time windows. In other embodiments, the neural network may be expanded to predict priority levels with finer temporal granularity. For example, each node in the output layer of the neural network may correspond to a two-dimensional temporal window denoted as [day of the week, time window of the day], e.g., [Wed., 8 PM-11 PM]. The expanded neural network may provide more accurate classification because the receptacles may be used differently during the same time window but on different days.

In some embodiments, server 160 may re-train or re-adjust the deployed machine learning model based on the locally collected new training data. The pre-trained machine learning model may be trained based on the training data collected from the general domain (e.g., a large number of power receptacles from other buildings or users). When being deployed in a specific domain such as a user's house or office, the machine learning model may go through a domain adaptation to adapt to the new domain. In some embodiments, the domain-adaptation process may include presenting the classification results of the power receptacles 180 to the user for the user to confirm or correct. Based on the user input, the machine learning model may readjust the parameters to minimize the distance between its future classification result and the user's input. In other embodiments, the domain-adaptation process may include receiving user preemptions (e.g., user's manual control of the power receptacles 180) that are different from the power management signals sent by the server 160 to the power receptacles 180. The user preemptions may be deemed as an indication that the classification was inaccurate. For example, after receiving user preemptions more than a threshold number of times, the machine learning model may adjust its parameters so that the classification result is not in line with the user's preference. As another example, the end-point classification component 166 may directly adjust the priorities of power receptacles 180 after receiving the user preemptions, and then perform the retraining/adjustment in the backend.

In some embodiments, the power management signal receiving component 168 may be configured to obtain a power management signal. The power management signal may be received from a power grid (e.g., a broadcasted signal to enter power saving mode), a user input using a smart device, a user-configured schedule, a real-time determination of the crowdedness within the building unit (e.g., a building, a section of a building, a house, a room of a house). In some embodiments, the server 160 may automatically set up a power-management schedule, which may generate signals to enter power-saving mode at a specific point in time. For example, server 160 may crawl web pages associated with the power grid company to look for electricity rate schedules. If the house has a time-of-use plan, the electricity rates may fluctuate throughout the day or the week. The server 160 may extract the rate schedule and automatically set up a program for power management, which may send out wireless signals to the power receptacles 180 to enter a power-saving mode when the rate is at its highest.

In some embodiments, the power management signal receiving component 168 may collect various data to determine how many people are within a current building unit. The various data may include direct data such as sensor data collected at an entrance and/or an exit of the current building unit, and indirect data such as a real-time reading of the WiFi access point connections. These data may be monitored in real-time to promptly reflect the change of the crowdedness of the building unit. The number of people present in the current building unit may be mapped to one of a plurality of pre-configured crowdedness levels. Each of the plurality of pre-configured crowdedness levels may correspond to a power management signal. For instance, if the number of people within the current building unit is less than a first threshold, the power management signal may include an instruction to enter a power-saving mode, in which only the critical receptacles (e.g., those connected to critical appliances) are kept on; if the number of people within the current building unit is greater than the first threshold but less than a second threshold, the power management signal may include an instruction to enter a power-essential mode, in which the critical and essential receptacles are kept on and the other "normal" receptacles are turned off.

The real-time monitoring of the crowdedness within the current building unit may be resource intensive and lead to system inefficiency in the long term. In some embodiments, the real-time monitoring may be performed for a period of time, and the collected data may be used to build a time-series of how the current building unit is being used. For example, every crowdedness changes (e.g., including the crowdedness levels and the time of the changes) throughout a day, a week, or a month may be stored and used to build a usage pattern of the current building unit. The usage pattern may be used to predict the power management signals at specific time of the day. With the usage pattern, the real-time monitoring may not have to be performed all the time. For example, the power management signal receiving component 168 may determine the power management signals based on the predictions made from the time-series of how the current building unit is being used, and monitor how many of these power management signals are preempt or overridden by the endpoints (e.g., the receptacles, and/or operators). If the number of preemption and overrides are over a limit, it means the usage pattern of the current building unit has changed. In this case, the real-time monitoring of the crowdedness may be retriggered to collect new data for another period of time and update the time-series of the usage pattern.

In some embodiments, the end-point management component 169 may be configured to transmit a plurality of control signals to the plurality of power receptacles 180 based on the power management signal and respective priorities of the plurality of electrical devices attached to the plurality of power receptacles. For instance, in response to the power management signal being entering a power-saving mode, the end-point management component 169 may determine the control signals for power receptacles 180 of low priority as sending switch-off signals, and the control signals for power receptacles 180 of high priority as NULL (e.g., high priority electrical devices such as refrigerator may not be affected by the power-saving signal). In some embodiments, if a power receptacle has a medium priority, the server 160 may determine the type of the electrical device attached to the power receptacle before determining the control signal. For example, in response to the electrical device being a light, the control signal may include (1) dimming the light and (2) lowering the priority of the electrical device to the lower priority. In response to the electrical device being a device (e.g., a computer, a laptop, a smart device) installed with a driver program associated with the plurality of power receptacles 180, the control signal may include sending a request through the driver program to the electrical device for switch-off the power receptacle. In some cases, the driver program on the device may determine whether it is safe to switch off at the moment. If it is safe, the device may return a confirmation message to the end-point management component 169 for switching off the power receptacle.

In some embodiments, the plurality of control signals may be determined multiple times after the power management signal is received. For instance, the end-point management component 169 may determine a set of control signals based on the current priority classification based on the power management signal. Before a new/different power management signal is received, the priority classification may change when entering the next pre-configured time slot (e.g., the classification may change every 3 hours or 6 hours). In this case, the end-point management component 169 may determine a new set of control signals.

In some embodiments, the determining and broadcasting of the control signals for the receptacles 180 may be determined asynchronously. That is, the plurality of control signals may be associated with respective timestamps for sending to the corresponding power receptacles 180 (e.g., like a delayed transmission).

In some embodiments, the one or more end-point classification tables 170 may be stored in a local database within the on-prem server or cloud storage. The end-point classification tables 170 may be constructed in various ways. More details are described in FIGS. 2A and 2B.

Figure 2A:
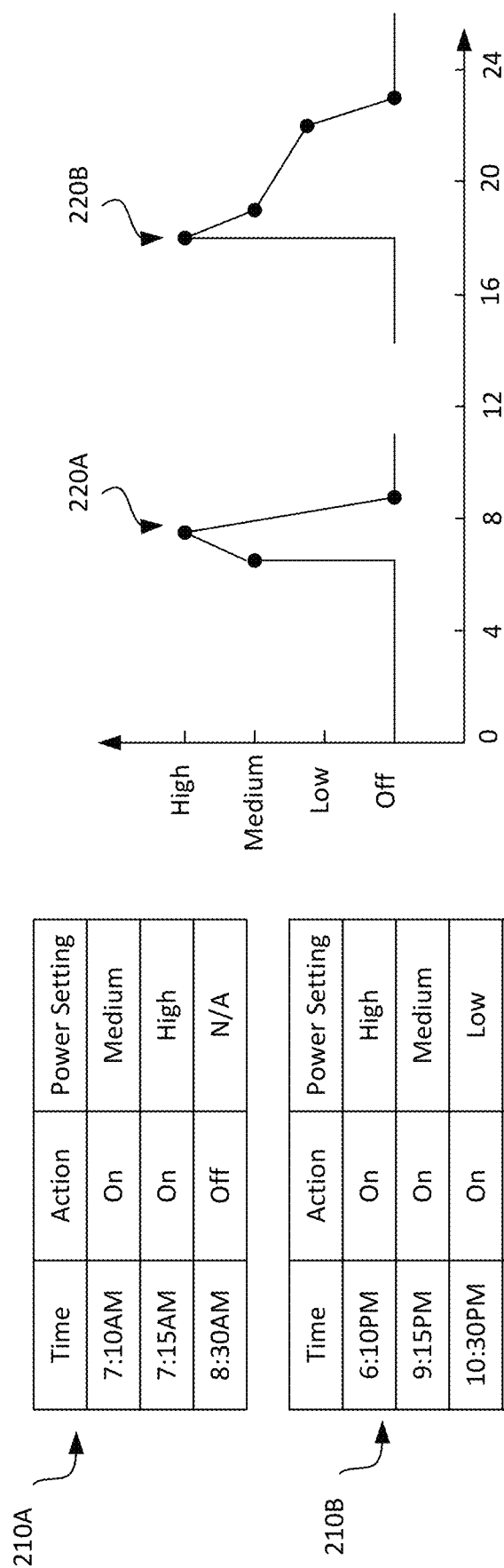
FIG. 2A illustrates exemplary power usage information of endpoints in accordance with some embodiments.

FIG. 2A illustrates exemplary power usage information of endpoints in accordance with some embodiments. As shown, tables 210A and 210B list the power control signals received by two power receptacles, along with the timestamps and power settings. This information may be stored by the power receptacles and/or sent to a server for data transformation. For example, these two tables may be represented as two curves in a two-dimensional space, with a first dimension corresponding to hours of a day and a second dimension corresponding to the power settings. These curves may be used as inputs for determining the priority of the power receptacles.

Figure 2B:
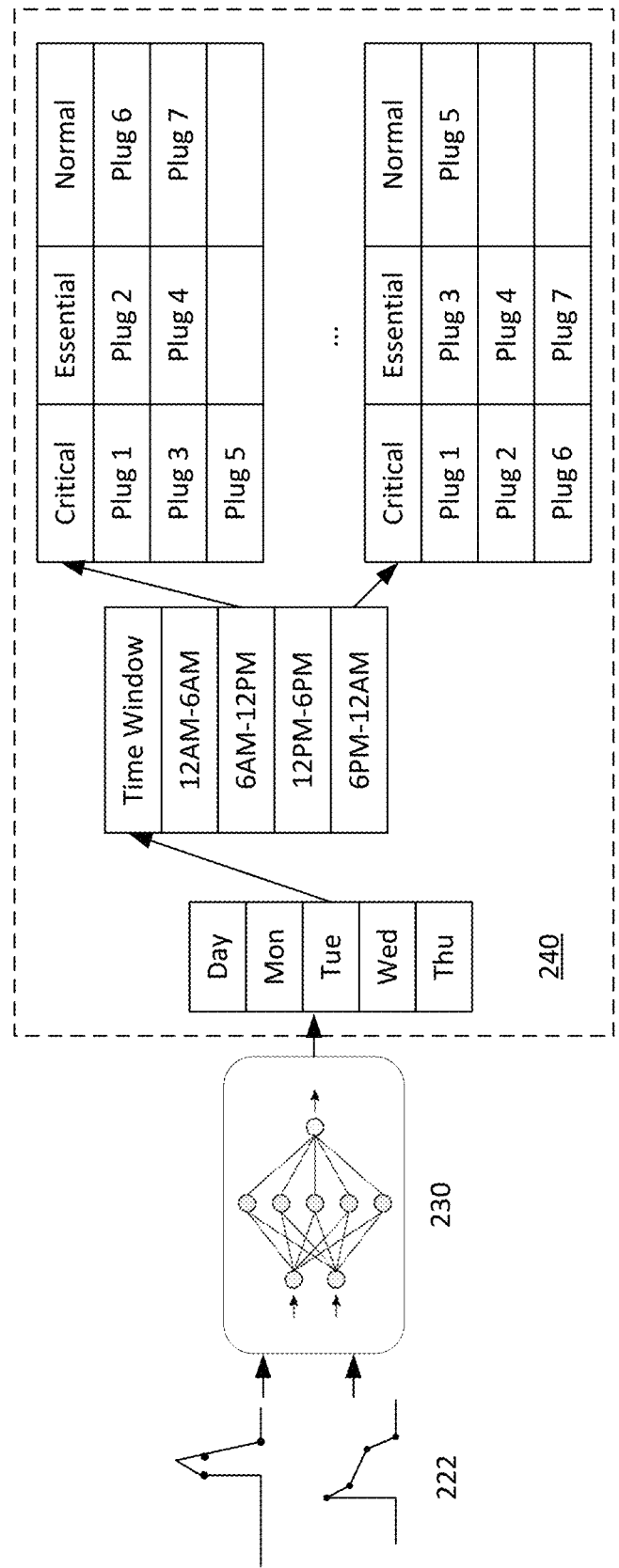
FIG. 2B illustrates an exemplary workflow for classifying endpoints with various priorities in accordance with some embodiments.

FIG. 2B illustrates an exemplary workflow for classifying endpoints with various priorities in accordance with some embodiments. For illustrative purposes, the machine learning model 230, e.g., a neural network, for pattern classification is presumed as trained. After receiving the input curves 222 (e.g., the curves from FIG. 2A), the machine learning model 230 may predict priority levels for the corresponding power receptacles. These priority levels may be stored in a multi-layer 240 table for power management.

In some embodiments, a same power receptacle may have different priority levels throughout the day or the week. For instance, a TV may have a high priority in the evenings during the weekdays or during the weekends. The multi-layer table 240 is designed to reflect such priority dynamics. As shown in FIG. 2B, a first layer of the table 240 may correspond to the days of a week. Each element in the first layer may correspond to a second layer table, which includes time windows of the day. Each element in the second layer may correspond to an actual priority table at the leaf layer storing the priorities of the power receptacles at corresponding time windows. In some embodiment, the table 240 may be implemented as a multi-layer bitmap, in which each day in the first layer may be represented as a bit, and each time window in the second layer may be represented as a bit. The bitmap may save the footprint of the table 240 significantly, which makes deployment at edge devices easier.

Figure 3:
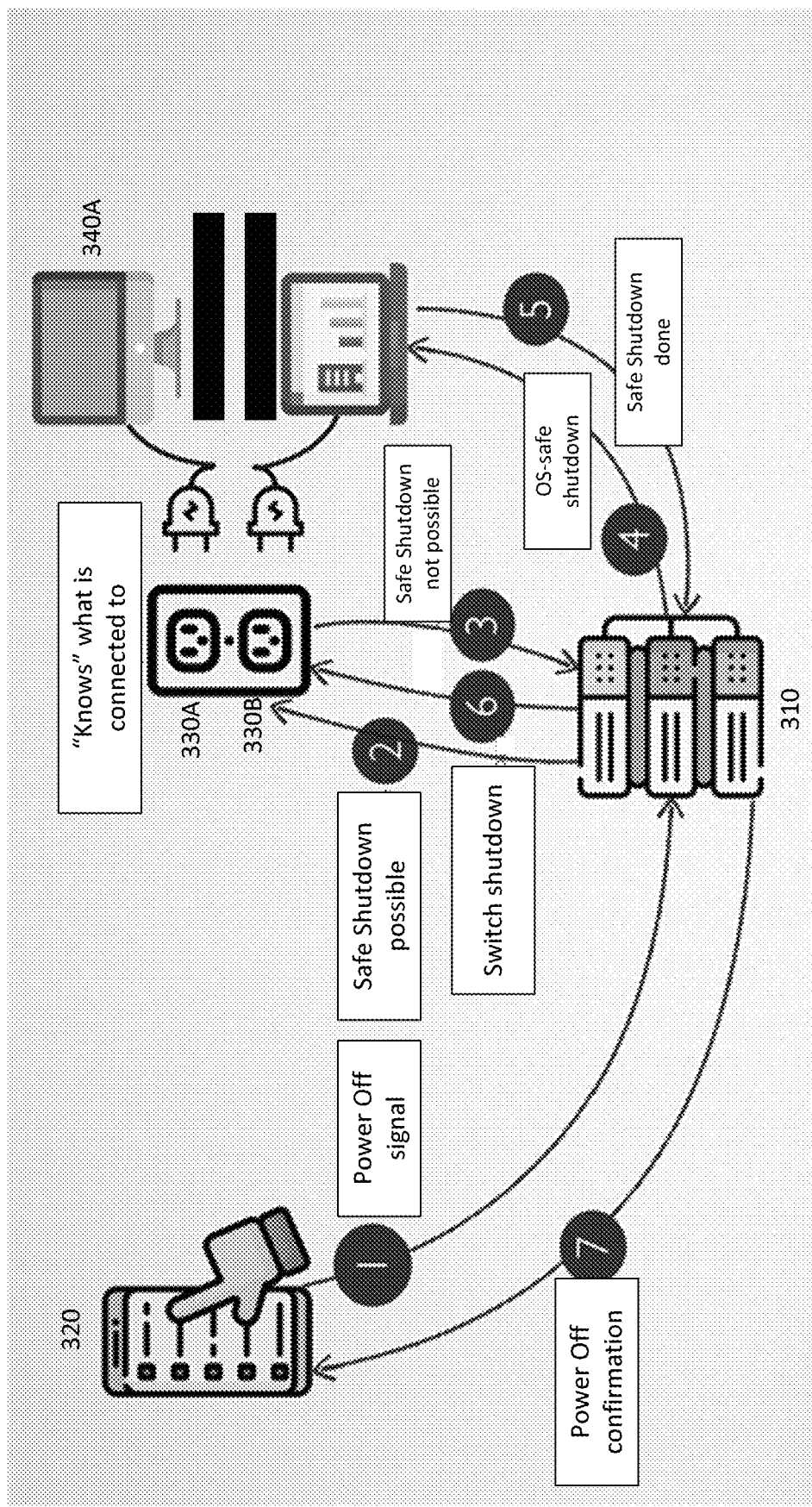
FIG. 3 illustrates an exemplary network diagram for managing devices installed with drivers of the IoT system in accordance with some embodiments.

FIG. 3 illustrates an exemplary network diagram for managing devices installed with drivers of the IoT system in accordance with some embodiments. The control flow in FIG. 3 are for illustrative purposes only, and may be implemented in different ways depending on the use case. Here, the "driver" refers to a software program installed on a device (e.g., a desktop, a laptop, a smart device) for providing programming interfaces to communicate with another device (e.g., a server 310) and control the underlying hardware of the device. As shown in FIG. 3, the drivers may be installed on a desktop 340A and a laptop 340B, which may be attached to power receptacles 330A and 330B, respectively. Both the power receptacles (330A and 330B) and the devices (desktop 340A and laptop 340B) may communicate with the server 310 through wireless or wired connections.

The network diagram in FIG. 3 may start with generating a power-off signal from a smart device 320. The smart device 320 FIG. 3 may be a smartphone, a smart home hub, a computer, a laptop, or another suitable device. The power-off signal may be sent to a server 310 (on-prem or cloud) for controlling power receptacles (330A and 330B) and the attached electronic devices (340A and 340B).

In some embodiments, the server 310 may first identify the priority levels of the devices. As an example, the desktop 340A is assumed to be a machine that has to be online all the time, and its priority level has been classified as critical. This priority level (e.g., critical device) may be specified by the user or determined through self-discovery (e.g., by using the machine learning model described in FIGS. 2A and 2B). The laptop 340B is assumed to be a machine that may go offline if certain conditions are met (e.g., there are no running processes running on the laptop 340 that block the operating system from going to sleep or power-off).

In response to identifying the desktop 340A as a critical device, the server 310 may directly skip performing power-management on the desktop 340A. It means the power receptacle 330A corresponding to the desktop 340A may not go into the power-saving model. In some embodiments, the server 310 may first send a "safe-shutdown-possible" signal to the power receptacle 330A corresponding to the desktop 340A. The "safe-shutdown-possible" signal may include a query that checks if the electronic device, i.e., the desktop 340A, attached to the power receptacle 330A is able to shut down safely. The power receptacle 330A may query the desktop 340A by means of a driver program or from a central server, to check if a safe shutdown is possible. If the desktop 340A is running some processes blocking the device from going into sleep or power-saving mode, it may return a signal back to the power receptacle 330A indicating "safe shutdown is not possible." The power receptacle 330A may forward such signal back to the server 310 refusing to shut down. This type of signal may be referred to as device preemption. When the number of device preemption reaches a threshold, the server 310 may promote the priority level of the corresponding power receptacle 330A to a higher level, so that no "safe-shutdown signals" will be sent to the power receptacle 330A in the future.

In response to identifying the laptop 340B as a low priority device, the server 310 may first send a "safe-shutdown" signal to the power receptacle corresponding to the laptop 340B. The "safe-shutdown" signal may include a command to shut down the electronic device attached to the power receptacle. It means, "safe-shutdown" signal requests the device to shut down, without querying if the device is able to safely shutdown (e.g., different from "safe-shutdown-possible"). In some embodiments, the "safe-shutdown" signal sent to the laptop 340B may be registered with the laptop 340B, which may trigger the driver program to actively clean up the processes that block the safe shutdown. Once the processes are all cleaned up, the laptop 340B may shut down itself safely, and send a confirmation directly to the server 310 indicating the operating system of the laptop 340B has already safely shut down.

FIG. 4 illustrates an example method 400 for improving energy efficiency using an IoT system in accordance with some embodiments. Method 400 may be performed by a computer device, apparatus, or system. The method 400 may be performed by one or more modules/components of the environment or system illustrated by FIGS. 1A-3. The operations of the method 400 presented below are intended to be illustrative. Depending on the implementation, method 400 may include additional, fewer, or alternative steps performed in various orders or parallel.

Block 410 includes receiving, by a computing device from each of a plurality of power receptacles, power usage information of an electrical device attached to the power receptacle. In some embodiments, the plurality of power receptacles comprise a plurality of smart outlets with adjustable power output. In some embodiments, the plurality of power receptacles are connected to the computing device through Bluetooth or a wireless connection. In some embodiments, the power usage information comprises historical control signals received by the power receptacle and corresponding timestamps, wherein the historical control signals comprise switch-on signals, switch-off signals, and power adjustment signals.

Block 420 includes determining, by the computing device for each of the plurality of power receptacles, a plurality of power usage metrics of the power receptacle based on the power usage information, wherein the plurality of power usage metrics comprise a power-switch frequency of the electrical device attached to the power receptacle and power consumption of the electrical device.

Block 430 includes feeding, by the computing device, the plurality of power usage metrics into a machine learning model to obtain a priority of the electrical device attached to the power receptacle, wherein the priority is one of a plurality of pre-configured priorities. In some embodiments, the plurality of pre-configured priorities comprise a high priority, a medium priority, and a low priority.

Block 440 includes obtaining, by the computing device, a power management signal. In some embodiments, the obtaining of the power management signal comprises: receiving the power management signal from an electric grid, wherein the power management signal comprises a broadcasted message for entering or exiting a power-saving mode. In some embodiments, the obtaining of the power management signal comprises: receiving the power management signal from a smart device linked to the plurality of power receptacles for entering or exiting a power-efficient mode, or entering or exiting a power-saving mode. In some embodiments, the obtaining of the power management signal comprises: crawling, using a webpage crawler, a web site associated with an electricity grid to obtain an electricity rate schedule, wherein the electricity rate schedule comprises a plurality of rate tiers at different time windows; and generating the power management signal to enter a power-saving mode or a power-efficient mode at a point of time when an electricity rate changes to a higher tier.

Block 450 includes transmitting, by the computing device, a plurality of control signals to the plurality of power receptacles based on the power management signal and respective priorities of the plurality of electrical devices attached to the plurality of power receptacles. In some embodiments, the transmitting of the plurality of control signals to the plurality of power receptacles comprises: in response to the power management signal being entering a power-saving mode, determining, for each of the plurality of power receptacles, a corresponding control signal based on the power management signal and the priority of the electrical device attached to the power receptacle, wherein the determining of the corresponding control comprises: if the priority of the electrical device is the high priority, determining the control signal as null; and if the priority of the electrical device is the low priority, determining the control signal comprising a switch-off signal to the power receptacle. In some embodiments, the determining of the corresponding control signal further comprises: if the priority of the electrical device is the medium priority, identifying the type of the electrical device; in response to the electrical device being a light, determining the control signal as dimming the light; and in response to the electrical device being a device installed with a driver program associated with the plurality of power receptacles, determining the control signal as sending a request through the driver program to the electrical device for switch-off the power receptacle. In some embodiments, the transmitting of the plurality of control signals to the plurality of power receptacles comprises: determining a plurality of points of time for transmitting the plurality of control signals to the plurality of power receptacles; and transmitting each of the plurality of control signals to the plurality of power receptacles at a respective point of time.

In some embodiments, method 400 may further include receiving, from the electrical device through the driver program, a confirmation indicating the electrical device is already shut down.

In some embodiments, the method 400 may further include training the machine learning model. The training process may include: obtaining, from a plurality of training power receptacles installed in buildings registered for collecting training data, training power usage information of the plurality of training power receptacle; generating, using the machine learning model, priority labels of the plurality of training power receptacles based on the training power usage information; displaying the priority labels of the plurality of training power receptacles on a user-interface (UI) for user input; receiving one or more updated priority labels from the user input; updating feature weights of the machine learning model based on the one or more updated priority labels and corresponding power usage information.

In some embodiments, the method 400 may further include: after transmitting a control signal to the power receptacle to change a power status, receiving a user-provided control signal that is different from the control signal; and updating the priority of the electrical device attached to the power receptacle based on the user-provided control signal.

Figure 5:
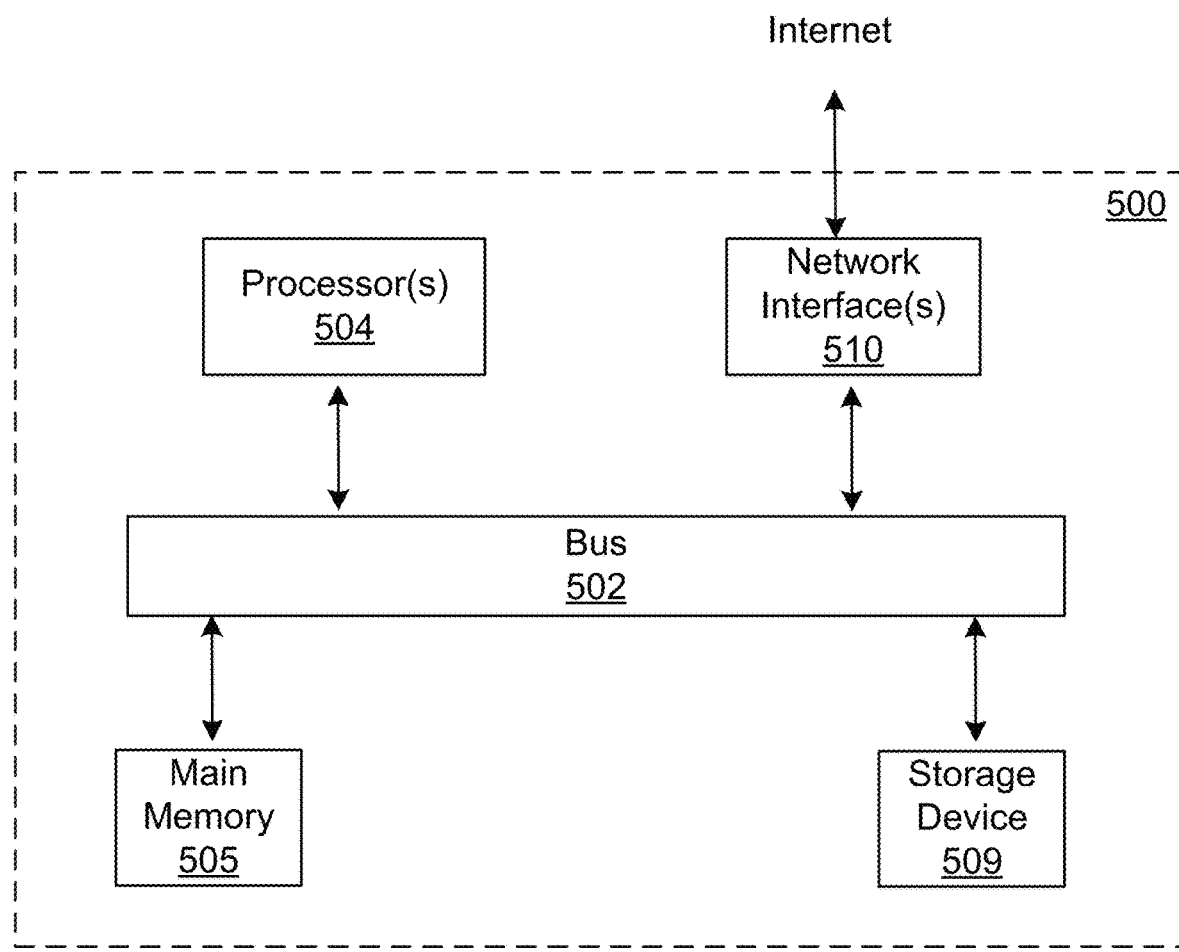
FIG. 5 illustrates an example computing device in which any of the embodiments described herein may be implemented.

FIG. 5 illustrates an example computing device in which any of the embodiments described herein may be implemented. The computing device may be used to implement one or more components of the systems and the methods shown in FIGS. 1A-4 The computing device 500 may comprise a bus 502 or other communication mechanisms for communicating information and one or more hardware processors 504 coupled with bus 502 for processing information. Hardware processor(s) 504 may be, for example, one or more general-purpose microprocessors.

The computing device 500 may also include a main memory 505, such as a random-access memory (RAM), cache and/or other dynamic storage devices, coupled to bus 502 for storing information and instructions to be executed by processor(s) 504. Main memory 505 also may be used for storing temporary variables or other intermediate information during the execution of instructions to be executed by processor(s) 504. Such instructions, when stored in storage media accessible to processor(s) 504, may render computing device 500 into a special-purpose machine that is customized to perform the operations specified in the instructions. Main memory 505 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 500 may implement the techniques described herein using customized hard-wired logic, one or more ASICs or FPGAs, firmware and/or program logic which in combination with the computing device may cause or program computing device 500 to be a special-purpose machine. According to one embodiment, the techniques herein are performed by computing device 500 in response to processor(s) 504 executing one or more sequences of one or more instructions contained in main memory 505. Such instructions may be read into main memory 505 from another storage medium, such as storage device 509. Execution of the sequences of instructions contained in main memory 505 may cause the processor(s) 504 to perform the process steps described herein. For example, the processes/methods disclosed herein may be implemented by computer program instructions stored in main memory 505. When these instructions are executed by processor(s) 504, they may perform the steps as shown in corresponding figures and described above. In alternative embodiments, hard-wired circuitry may be used in place of or in combination with software instructions.

The computing device 500 also includes a communication interface 510 coupled to bus 502. Communication interface 510 may provide a two-way data communication coupling to one or more network links that are connected to one or more networks. As another example, communication interface 510 may be a local area network (LAN) card to provide a data communication connection to a compatible LAN (or WAN component to communicate with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each process, method, and algorithm described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be composed in program codes or instructions stored in a memory (e.g., a non-transitory computer-readable storage medium described above). Such an algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method for saving energies at homes and offices with an Internet of Things (IoT) system, comprising:
   receiving, by a computing device from each of a plurality of power receptacles, power usage information of an electrical device attached to the power receptacle;
   generating, by the computing device for each of the plurality of power receptacles, a plurality of power usage metrics of the power receptacle based on the power usage information, wherein the plurality of power usage metrics comprise a power-switch frequency of the electrical device attached to the power receptacle and power consumption of the electrical device;
   feeding, by the computing device, the plurality of power usage metrics into a machine learning model to obtain a priority of the electrical device attached to the power receptacle, wherein the priority is one of a plurality of pre-configured priorities;
   obtaining, by the computing device, a power management signal; and
   generating and transmitting, by the computing device, a plurality of control signals to the plurality of power receptacles based on the power management signal and respective priorities of the plurality of electrical devices attached to the plurality of power receptacles, wherein the generating and transmitting comprises:
      if the power management signal being entering a power-saving mode and the priority of the electrical device is high, sending a query signal to the power receptacle corresponding to the electrical device to query if the electrical device is safe to shut down; and
      if the power management signal being entering a power-saving mode and the priority of the electrical device is low, sending a shutdown signal to the power receptacle corresponding to the electrical device to shut down the electrical device.

2. The method of claim 1, wherein the receiving power usage information of the electrical device attached to the power receptacle comprises:
   obtaining an aggregated power consumption of the plurality of power receptacles during a period of time;
   obtaining power states of the plurality of power receptacles during the period of time; and
   feeding the aggregated power consumption and the power states of the plurality of power receptacles into a second machine learning model to determine power usage information of each of the plurality of power receptacles.

3. The method of claim 2, wherein the second machine learning model comprises a linear regression model with multiple variables respectively corresponding to the plurality of power receptacles.

4. The method of claim 1, wherein the obtaining of the power management signal comprises:
   receiving the power management signal from an electrical grid, wherein the power management signal comprises a broadcasted message for entering or exiting a power-saving mode.

5. The method of claim 1, wherein the obtaining of the power management signal comprises:
   receiving sensor data collected at an entrance of a current building unit;
   determining a quantity of people present in the current building unit based on the sensor data;
   determining the power management signal for the current building unit based on the quantity of people present in the current building unit, wherein the determining comprises:
   determining a level of crowdedness based on the quantity of people present in the current building unit; and
   determining the power management signal corresponding the level of crowdedness.

6. The method of claim 5, wherein the determining the quantity of people present in the current building unit further comprises:
   retrieving a real-time quantity of Wi-Fi access point connections; and
   determining the quantity of people present in the current building unit based on the sensor data and the real-time quantity of Wi-Fi access point connections.

7. The method of claim 1, wherein the obtaining of the power management signal comprises:
obtaining the power management signal from a smart device linked to the plurality of power receptacles for entering or exiting a power-efficient mode, or entering or exiting a power-saving mode.

8. The method of claim 1, wherein the plurality of power receptacles comprise a plurality of smart outlets with adjustable power output.

9. The method of claim 1, wherein the plurality of power receptacles are connected to the computing device through a wireless connection.

10. The method of claim 1, wherein the plurality of pre-configured priorities comprise a high priority, a medium priority, and a low priority.

11. The method of claim 1, wherein the generating of the corresponding control signal further comprises:
identifying a type of the electrical device;
in response to the electrical device being a light, generating the corresponding control signal as dimming or turning off the light; and
in response to the electrical device being a smart device, determining whether the smart device is installed with a driver program associated with the plurality of power receptacles, and sending a shutdown signal to the power receptacle corresponding to the electrical device for the power receptacle to initiate a shutdown process through the driver program.

12. The method of claim 11, wherein the method further comprises:
receiving, from the electrical device through the driver program, a confirmation indicating the electrical device is already shut down.

13. The method of claim 1, wherein the method further comprises training the machine learning model, wherein the training comprises:
obtaining, from a plurality of training power receptacles installed in buildings registered for collecting training data, training power usage information of the plurality of training power receptacle;
generating, using the machine learning model, priority labels of the plurality of training power receptacles based on the training power usage information;
displaying the priority labels of the plurality of training power receptacles on a user interface (UI) for user input;
receiving one or more updated priority labels from the user input; and
updating feature weights of the machine learning model based on the one or more updated priority labels and corresponding power usage information.

14. The method of claim 1, wherein the obtaining the power management signal comprises:
crawling, using a webpage crawler, a website associated with an electricity grid to obtain an electricity rate schedule, wherein the electricity rate schedule comprises a plurality of rate tiers at different time windows; and
generating the power management signal to enter a power-saving mode or a power-efficient mode at a point of time when an electricity rate changes to a higher rate tier.

15. The method of claim 1, further comprising:
after transmitting a control signal to the power receptacle to change a power status, receiving a user-provided control signal that is different from the control signal; and
updating the priority of the electrical device attached to the power receptacle based on the user-provided control signal.

16. An Internet of Things (IoT) system comprising a computing device configured with one or more processors and one or more non-transitory computer-readable memories coupled to the one or more processors and configured with instructions executable by the one or more processors to cause the system to perform operations comprising:
receiving, by the computing device from each of a plurality of power receptacles, power usage information of an electrical device attached to the power receptacle;
generating, by the computing device for each of the plurality of power receptacles, a plurality of power usage metrics of the power receptacle based on the power usage information, wherein the plurality of power usage metrics comprise a power-switch frequency of the electrical device attached to the power receptacle and power consumption of the electrical device;
feeding, by the computing device, the plurality of power usage metrics into a machine learning model to obtain a priority of the electrical device attached to the power receptacle, wherein the priority is one of a plurality of pre-configured priorities;
crawling, by the computing device using a webpage crawler, a website associated with an electricity grid to obtain an electricity rate schedule, wherein the electricity rate schedule comprises a plurality of rate tiers at different time windows;
generating, by the computing device, a power management signal to enter a power-saving mode or a power-efficient mode at a point of time when an electricity rate changes to a higher rate tier; and
generating and transmitting, by the computing device, a plurality of control signals to the plurality of power receptacles based on the power management signal and respective priorities of the plurality of electrical devices attached to the plurality of power receptacles.

17. A non-transitory computer-readable storage medium configured with instructions executable by one or more processors to cause the one or more processors to perform operations comprising:
receiving, from each of a plurality of power receptacles, power usage information of an electrical device attached to the power receptacle;
generating, for each of the plurality of power receptacles, a plurality of power usage metrics of the power receptacle based on the power usage information, wherein the plurality of power usage metrics comprise a power-switch frequency of the electrical device attached to the power receptacle and power consumption of the electrical device;
feeding the plurality of power usage metrics into a machine learning model to obtain a priority of the electrical device attached to the power receptacle, wherein the priority is one of a plurality of pre-configured priorities;
receiving a power management signal from an electrical grid, wherein the power management signal comprises a broadcasted message for entering or exiting a power-saving mode; and
generating and transmitting a plurality of control signals to the plurality of power receptacles based on the power management signal, wherein the generating and transmitting comprise:
identifying a type of the electrical device;

in response to the electrical device being a light, generating the corresponding control signal as dimming or turning off the light; and in response to the electrical device being a smart device, determining whether the smart device is installed with a driver program associated with the plurality of power receptacles, and sending a shutdown signal to the power receptacle corresponding to the electrical device for the power receptacle to initiate a shutdown process through the driver program.

18. The non-transitory computer-readable storage medium of claim 17, wherein the operations further comprise training the machine learning model, the training comprising:

obtaining, from a plurality of training power receptacles installed in buildings registered for collecting training data, training power usage information of the plurality of training power receptacle;

generating, using the machine learning model, priority labels of the plurality of training power receptacles based on the training power usage information;

displaying the priority labels of the plurality of training power receptacles on a user interface (UI) for user input;

receiving one or more updated priority labels from the user input; and updating feature weights of the machine learning model based on the one or more updated priority labels and corresponding power usage information.

* * * * *